United States Patent
Kesarwani

(10) Patent No.: US 10,387,295 B1
(45) Date of Patent: Aug. 20, 2019

(54) APPLICATION TESTING USING MULTIPLE CONTEXT-AWARE THREADS

(71) Applicant: Amazon Technologies, Inc., Seattle, WA (US)

(72) Inventor: Nitin Kesarwani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 14/704,886

(22) Filed: May 5, 2015

(51) Int. Cl.
*G06F 9/44* (2018.01)
*G06F 11/36* (2006.01)

(52) U.S. Cl.
CPC ...... *G06F 11/3688* (2013.01); *G06F 11/3692* (2013.01)

(58) Field of Classification Search
CPC ............. G06F 11/3688; G06F 11/3664; G06F 11/3684
USPC ......................................................... 717/124
See application file for complete search history.

(56) References Cited

U.S. PATENT DOCUMENTS

| | | | | |
|---|---|---|---|---|
| 8,813,035 B2 * | 8/2014 | Mathew | ............. | G06F 11/3684 717/124 |
| 9,201,750 B2 * | 12/2015 | Sugimura | ............... | G06F 11/26 |
| 2002/0124205 A1 * | 9/2002 | Grey | ................... | G06F 11/3688 714/33 |
| 2002/0124241 A1 * | 9/2002 | Grey | ......................... | G06F 9/52 717/149 |
| 2004/0015744 A1 * | 1/2004 | Klotz | .................. | G06F 11/3414 714/43 |
| 2006/0294347 A1 * | 12/2006 | Zou | ........................ | G06F 9/3009 712/244 |
| 2010/0229230 A1 * | 9/2010 | Edeki | ...................... | G06F 21/31 726/7 |
| 2011/0231465 A1 * | 9/2011 | Phatak | .................... | G06F 7/729 708/235 |
| 2012/0254888 A1 * | 10/2012 | Kalogeropulos | ....... | G06F 8/452 718/107 |
| 2013/0231888 A1 * | 9/2013 | Sugimura | ............. | G06F 11/263 702/123 |
| 2013/0332906 A1 * | 12/2013 | Razavi | ................ | G06F 11/3684 717/124 |
| 2014/0189714 A1 * | 7/2014 | Lawbaugh | .......... | H04L 41/0253 719/313 |
| 2015/0222953 A1 * | 8/2015 | Hassell | ............. | H04N 5/44543 725/54 |

* cited by examiner

*Primary Examiner* — John Q Chavis
(74) *Attorney, Agent, or Firm* — Thorpe North & Western, LLP.

(57) ABSTRACT

Technology is described for testing applications. Multiple testing threads that are to be used for testing an application may be identified. The multiple testing threads may be dispatched for execution using a unit testing framework. The multiple testing threads may be executed in parallel to test the application using testing context information that is related to each testing thread. Performance metrics may be collected for the application that is tested. The performance metrics may be transmitted from the multiple testing threads after parallel execution of the multiple testing threads.

20 Claims, 8 Drawing Sheets

APPLICATION TESTING USING MULTIPLE CONTEXT-AWARE THREADS

BACKGROUND

Application testing is a process in which applications that are executable in a computing environment may be tested for desired functionality and/or stability. For example, an application may be tested to ensure that the application performs functions correctly on command, is free of bugs (e.g., errors or other defects), etc. Testing of an application may be performed by developers during the development of an application, prior to the application release by application testers, after a Beta release by Beta testers, by a third party prior to the release of an application or when an application version is updated.

Application testing may be performed using manual testing models, automated testing models, or both. In some application development models, an independent group of testers may manually test the application after functionality of the software application is developed, but prior to the application being provided to customers. In automated testing, the application may be tested using a test suite that includes a set of test scripts or test instructions. The test suite may be executed against the application to determine whether the application functions as expected. For example, a distributed application in a computing service environment may be tested to determine how the distributed application performs under a load.

DETAILED DESCRIPTION

Figure 1:
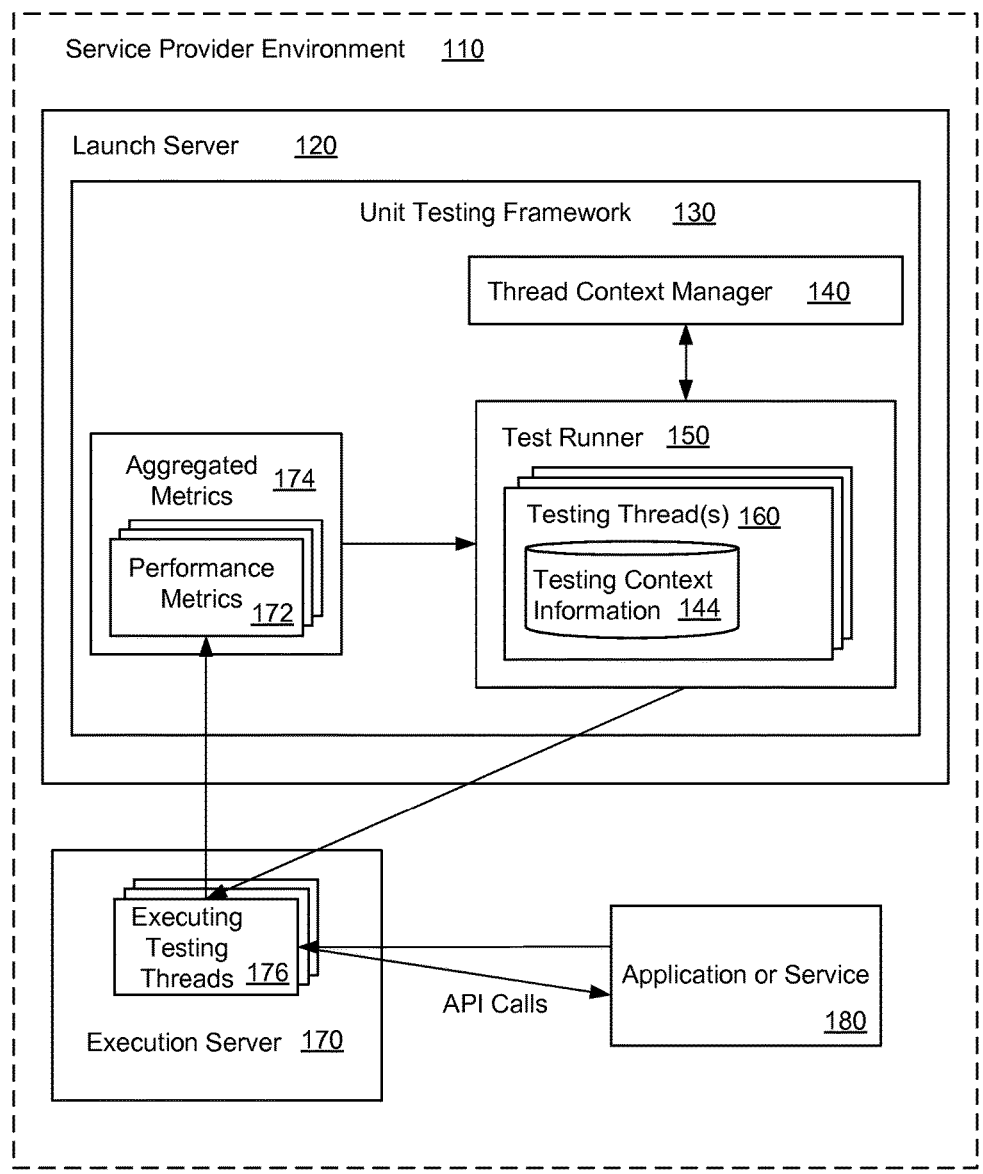
FIG. 1 illustrates a system and related operations for testing an application in a distributed service provider environment according to an example of the present technology.

A technology is described for testing an application using multiple testing threads which each have localized testing context information. The testing may take place for the application in a service provider environment. For example, the application may be a distributed service that is configured to perform specific application functions while executing on the service provider environment and the functions may be accessed using API (application program interface) calls. In another example, the application may be a centralized executable system that is configured to perform specific functions that are accessible using API calls. Multiple testing threads may be executed in parallel to perform multiple application tests. In one use case example, the application may undergo stress testing or load testing in order to determine a robustness of the application. The multiple testing threads may be executed in parallel as dispatched from a unit testing framework in the distributed service provider environment. Further, the multiple testing threads may be executed using testing context information that is separate and localized for each testing thread. Localization of the testing context information with respect to each testing thread and the unit testing framework (e.g., separate test data for the different testing threads) may result in a reduced likelihood of race conditions when the multiple testing threads are being executed in parallel. In addition, the parallelization of the testing thread execution based on the independent testing contexts may enable application test cases in a group in a test suite to be executed in a reduced amount of time, as compared to sequentially or serially executing the application test cases.

In one example, a fixed pool of testing threads or a fixed number of testing threads may be created for dispatch by a test runner in the unit testing framework. Each testing thread in the fixed pool of testing threads created by the unit testing framework may be associated with a portion of the application to be tested (e.g., a specific application source code class, one or more functions, etc.). Alternatively, each testing thread may be associated with a particular application test to be performed. The fixed pool may maintain a defined number of executing testing threads at a given time. The defined number of testing threads in the fixed pool may be launched for execution using the unit testing framework. Additional testing threads that are waiting to be executed may be included in a testing thread pool queue in the unit testing framework. As testing threads that are currently in the fixed pool finish executing, additional testing threads may be added to the fixed pool or fixed number of testing threads for execution.

The test runner in the unit testing framework may spawn or initiate multiple testing threads in the fixed pool that may be executed in parallel. The test runner may initiate execution of the multiple testing threads using a thread pool executor or thread pool dispatcher. The multiple testing threads may be executed in parallel on an execution server in the distributed service provider environment. For example, the multiple testing threads may be executed on computing instances running on the execution server. In addition, the multiple testing threads may be executed in parallel using testing context information that is linked to each testing thread. The testing context information may be specific to a particular testing thread. The local testing context information may be locally maintained at each testing thread and initially provided by a thread context manager in the unit testing framework.

In one example, the testing context information for each testing thread may include a test name associated with the testing thread to be executed, a list of testing values, test data or test arguments, a list of pre-computations to be performed before execution of the testing thread, and/or a list of tear downs to be performed before execution of the testing thread. Separate testing context information may be linked to each testing thread in order to reduce a likelihood of race conditions occurring during testing of the application. In other words, the race conditions may be prevented because each testing thread may use a separate copy of test data (i.e., test data is not shared between the testing threads). As a non-limiting example, a pre-computation to be performed prior to execution of the testing thread may include a database table initialization or a database table creation. As another non-limiting example, a tear down to be performed before execution of the testing thread may include a database table deletion.

In one configuration, the test runner that initiates or dispatches the parallel execution of the multiple testing threads may receive performance metrics from each testing thread after the execution of the testing thread is finished. A grouping of the performance metrics may indicate a robustness of a portion of the application that is tested. In one example, the performance metrics may be aggregated in order to provide an electronic report of the application test metrics or statistics. The report with the aggregated performance metrics may indicate potential problems in the application. For example, the electronic report may indicate that a particular part of the application or service is responding slowly when the number of tests exceeds a threshold of 1,000 requests per minute.

FIG. 1 illustrates an exemplary system for testing an application using a unit testing framework 130 in a service provider environment 110. In some example testing scenarios, the application may undergo stress testing or load testing to determine a robustness of the application or to verify deterministic properties of the application. As a non-limiting example, the application that is tested may be related to monitoring customer activity in a service provider environment. For example, the application that is tested may function to collect and track metrics, collect and monitor log files, provide resource utilization, provide application performance, set alarms, etc. with respect to customer activity in the service provider environment.

In one configuration, a test runner 150 may operate within the unit testing framework 130. The test runner 150 may operate on a launch server 120 in the service provider environment 110. More specifically, the test runner 150 may facilitate the testing of the application as directed by instructions (e.g., scripts, rules, etc.) provided by the unit testing framework 130. For example, the test runner 150 may initialize a plurality of testing threads 160, and each testing thread 160 may be associated with an application unit to be tested. The application unit may be a portion of the application that is being tested. Thus, the plurality of testing threads 160 may be associated with a plurality of application units, and a plurality of application tests associated with each of the application units.

The test runner 150 may receive instructions from the unit testing framework 130 to dispatch multiple testing threads 160 for execution. After the test runner 150 dispatches the multiple testing threads 160, multiple executing testing threads 176 may be executed in parallel on an execution server 170 in the service provider environment 110. The executing testing threads 176 may call an application or service 180 for testing of the application or service 180. For example, the executing testing threads 176 may call the application or service 180 to test specific functions that are performed at the application or service 180. The executing testing threads 176 can call the application or service 180 using API calls. In one example, the application or service 180 can be a distributed service or a centralized executable system located on a single virtualized computing device.

The multiple executing testing threads 176 may be executed at the execution server 170 in parallel using testing context information 144 that is related to each executing testing thread 176. In other words, separate and independent context information 144 may be linked to each executing testing thread 176. The context information 144 may be locally maintained at each executing testing thread 176 during execution but initially loaded from a thread context manager 140 in the unit testing framework 130. Since the executing testing threads 176 may have separate test data during execution, the multiple executing testing threads 176 may be executed in parallel without creating race conditions.

The executing testing threads 176 may return performance metrics 172 after being executed on the execution server 170. For example, the performance metrics 172 may indicate whether a particular application test succeeded or failed. Alternatively, the performance metrics 172 may capture a time period a test took to complete. For example, the test thread may make a request to an API and record the length of time that elapses until the response is received. The performance metrics 172 for the plurality of executing testing threads 176 may be compiled to form aggregated metrics 174. The aggregated metrics 174 may provide an overall assessment of the application that is tested. The aggregated metrics 172 may be provided to the unit testing framework 130, upon which the aggregated metrics 172 may be available for user viewing and/or analysis.

Prior unit testing frameworks (e.g., the JUnit testing framework) have executed tests in a sequential manner. The tests are executed sequentially because prior unit testing frameworks have used global test context information for the test. In other words, prior unit testing frameworks have used common resources (e.g., common test data) when executing the tests.

Using common resources in the parallel execution of tests may cause resource congestion. In addition, the sharing of resources may lead to race conditions (or synchronization problems) when multiple tests that are being executed in parallel are attempting to use the same data resource or other resources at the same time.

Prior unit testing frameworks may follow a specific sequence of events when invoking the application tests. An instance of the application test case for each test method may be serially constructed. For example, for five test methods, the unit testing framework may construct five instances for the application test cases. The unit testing framework may call a set up method for each application test case, call a test method for the application test case, and then call a tear down method for the application test case. In the past, this process may be repeated in a serial manner for each of the test methods in the application test case.

In one example of serial execution, in order for three application tests to be executed serially using a prior unit testing framework, a test runner may select a first application test and execute the first application test, then select a second application test and execute the second application test, and then select a third application test and execute the third application test. After the three application tests are executed, status information for the three executed application tests may be reported. In addition, information on which application tests passed, which application tests failed, execution run times, etc. may be reported. The serial or sequential execution of the application tests may result in an increased testing time, as opposed to parallelizing the execution of the application tests, as described in the present technology.

In prior unit testing frameworks, each application test may use common resources. For example, the unit testing framework may clean up the common resources before initializing an application test. During the application test, the unit testing framework may populate the common resources with respect to test expectations, and then clean up the common resources before the start of a subsequent application test. With respect to the subsequent application test, the common resources may be initialized with new test expectations, values, and so on. Prior unit testing frameworks do not recommend running the application tests in parallel because the application tests use the common resources and resource congestion is undesirable.

As a non-limiting example, a first application test and a second application test may use the same test data for application testing in an existing unit testing framework. The first application test that is executing may use a first database table initialization (e.g., Table Ti), and during a tear down, the first application test may use a first database table deletion operation. The second application test that is executing may use a second database table creation and during a tear down, the second application test may use a second database table deletion. If the first application test and the second application test are executed in parallel using a prior unit testing framework (e.g., in which test data is shared), the second application test may create a database table, but because of the race condition, the first application test that is executing may fail because the database table (e.g., Table Ti) was already created. In other words, overwriting the same test data may cause problems when executing application tests in parallel, as compared to prior unit testing frameworks.

In the present technology, the localization of the testing context information 144 with respect to each executing testing thread 176 (i.e., using test data that is separate for each executing testing thread 176) may enable the parallel execution of multiple executing testing threads 176 using the unit testing framework 130. Since each executing testing thread 176 may write to or manipulate the testing threads own copy of test data, the localized text context in the unit testing framework 130 may ensure testing thread safety. In other words, the test data may not be subject to two distinct writing processes (i.e., two separate testing threads) that create data conflicts. Since the test data may be separate between the executing testing threads 176, application program interface (API) calls from the executing testing threads 176 to the application service 180 may be independent of each other, thereby preventing interference between the multiple API calls that may occur at the same time with respect to the multiple executing testing threads 176. The localization of the testing context information 144 with respect to the executing testing threads 176 may avoid race conditions, in contrast to prior unit testing environments that attempt to execute multiple testing threads in parallel. In addition, the unit testing framework 130 may ensure testing thread safety even when the executing testing threads 160 are executed out of order.

As a non-limiting example, while serial or sequential execution of a test suite may take 30-40 minutes depending on response latency and other factors, parallel execution of the test suite may be achieved in approximately 5 minutes. In addition, the parallel execution may exert a relatively large amount of stress or load on the application being tested, which may be similar to when application testing is performed in a production environment. As a result, load problems may be more easily revealed using the testing threads as described.

Figure 2:
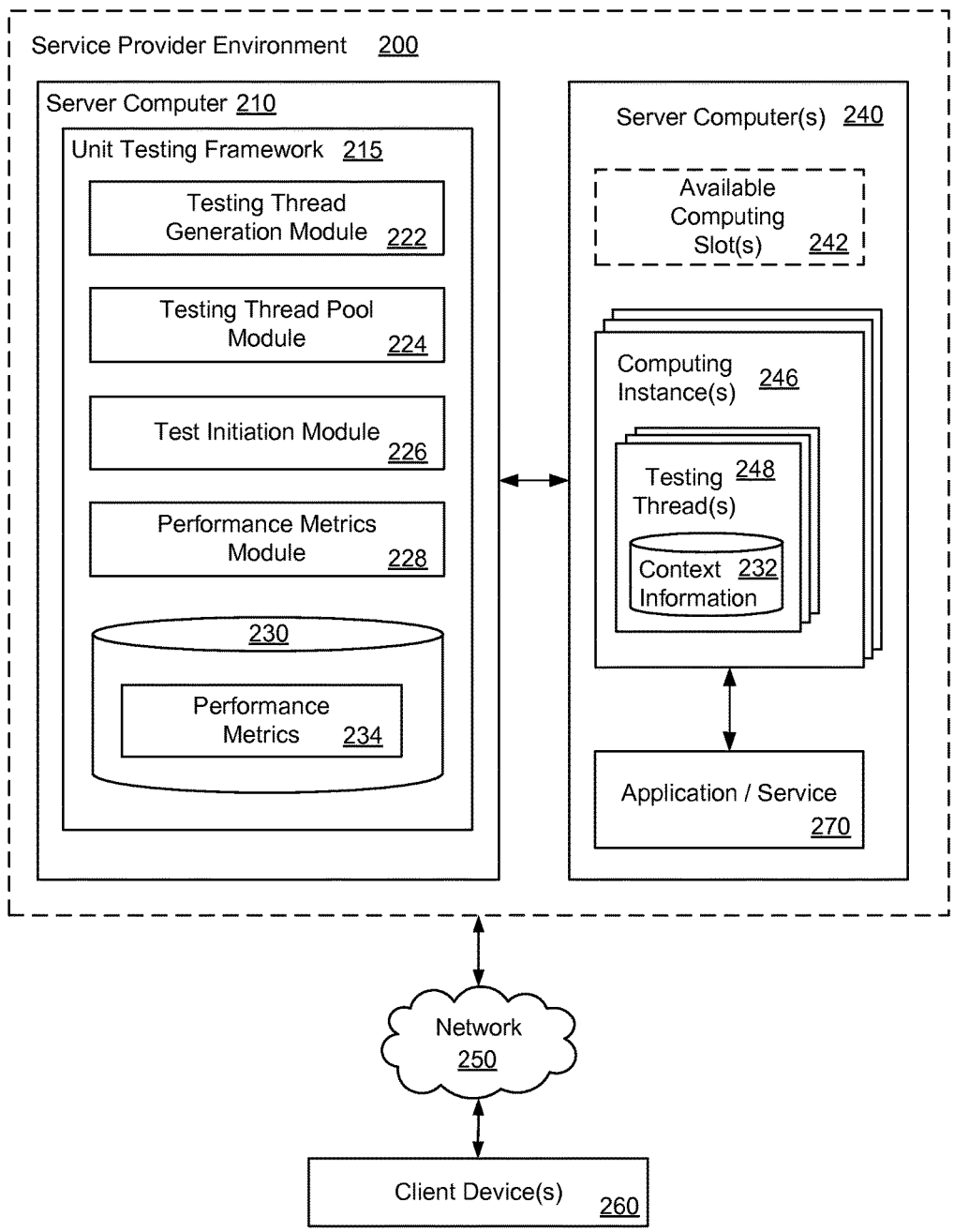
FIG. 2 is an illustration of a networked system in a service provider environment for testing applications according to an example of the present technology.

FIG. 2 illustrates components of an example service provider environment 200 according to one example of the present technology. The service provider environment 200 may include a server computer 210 in communication with a number of client devices 260 via a network 250. The server computer 210 may contain a data store 230 and a number of modules to perform application testing. In addition, the service provider environment 200 may include a number of server computers 240 executing a plurality of computing instances 246. The server computers 240 may communicate using a virtual network that is an overlay on an actual computing service network.

The server computers 240 may have available computing slots 242 (e.g., idle computing resources) that may be used to execute computing instances 246. In one example, the computing instances 246 may be used for executing testing threads 248. The execution of the testing threads 248 may enable an application (or a portion of an application) to be tested. The available computing slots 242 may be allocated to customers who may then utilize an available computing slot 242 to execute the computing instance 246.

Referring again to the server 210, the data stored in the data store 230 may include performance metrics 234. The performance metrics 234 may be for the testing threads 248 that are executed using the computing instances 246 in the service provider environment 200. The performance metrics 234 may indicate a robustness level for each portion of the application that is tested. In other words, the performance metrics 234 may indicate whether the portion of the application was successfully tested or failed in some way during the application testing. The portion of the application may be a specific application source code class, a group of functions, etc. In one example, the performance metrics 234 may be aggregated in order to provide a report of application test metrics or statistics. The report with the aggregated performance metrics may indicate potential problems in the application. In addition, the report may recommend to correct or debug certain portions of the application that failed (e.g., updating the code in the application), and then retest the application (or an updated portion of the application). In one configuration, the performance metrics 234 may include execution times for executing each testing thread 248. An execution time may be determined based on an amount of time taken for receiving responses from a corresponding testing thread 248 after performing a service call, an API call or another operation.

The server computer 210 may include a testing thread generation module 222, a testing thread pool module 224, a test initiation module 226, a performance metrics module 228, and other applications, services, processes, systems, engines, or functionality not discussed in detail herein. The testing thread generation module 222 may be configured to generate testing threads 248 that are to be launched for execution using a unit testing framework 215. The testing threads 248 may be launched for execution in order to perform application testing. A single testing thread 248 may be used for testing a portion of an application or service 270. In other words, each testing thread 248 may be used for testing each particular part of the application or service 270. The testing thread 248 may be an executable thread that is to be executed in order to test the portion of the application or service 270. For example, the application or service 270 may be tested by applying a predefined amount of stress to the application or service 270 in order to determine a robustness level of the application or service 270.

In one example, the testing thread 248 may have associated context information 232. The context information 232 may also be referred to as a thread local context or testing context information. The context information 232 may be separate for each of the testing threads 248 to be executed using the computing instances 246. In other words, the context information 232 may be specific or localized to a particular testing thread 248 (i.e., the testing threads 248 do not share data resources or data during execution) so that application test iterations do not overwrite the context information 232, which may lead to race conditions or corruption of the tests. The context information 232 may be maintained at the testing thread 248 as provided from a testing context manger in a unit testing framework 215. The context information 232 may include, for each testing thread 248, a test name associated with the testing thread 248 to be executed, test data, a list of pre-computations to be performed before execution of the testing thread 248, and a list of tear downs to be performed before execution of the testing thread 248. In addition, the context information 232 may include parameters (e.g., numerical, text, records, etc.) to be used for API calls or other functional operations of the application being tested. In one example, the context information 232 may include data sent to an application program interface (API) prior to or during execution of the testing threads 248. As non-limiting examples, a pre-computation to be performed prior to execution of the testing thread 248 may include a database table initialization or a database table creation. As another non-limiting example, a tear down to be performed before execution of the testing thread 248 may include a database table deletion.

The testing thread pool module 224 may be configured to define the number of the testing threads 248 to be launched for execution to a fixed pool of testing threads. The fixed pool of testing threads may maintain a defined number of testing threads 248 at a given time. The fixed pool may enable the defined number of testing threads 248 to be executed at the same time using the unit testing framework 215. The testing threads 248 in the fixed pool of testing threads may be initially idle and initialized prior to execution. As a non-limiting example, the fixed pool may enable 10,000 testing threads to be executed at the same time using the unit testing framework 215. In one configuration, additional testing threads 248 that are waiting to be executed may be included in a testing thread pool queue. The testing thread pool module 224 may determine when testing threads 248 in the fixed pool have finished being executed, and then the testing thread pool module 224 may authorize the dispatch of some of the additional testing threads 248 from the testing thread pool queue in order to move the testing threads 248 to the fixed pool of testing threads.

The test initiation module 226 may be configured to initiate (e.g., launch, start or spawn) multiple testing threads 248 from the unit testing framework 215 for parallel execution on the computing instances 246. One non-limiting example of the unit testing framework 215 is a JUnit testing framework. The multiple testing threads 248 may be launched using a test runner that operates in the unit testing framework 215. The multiple testing threads 248 may be executed in parallel using the context information 232 from the unit testing framework 215 that is linked to each testing thread 248. For example, a first testing thread may be associated with first testing context information, a second testing thread may be associated with second testing context information, and so on. In other words, a list of pre-computations, test data, a list of setups, a list of tear downs, etc. can be separate for each testing thread 248. Since multiple testing threads 248 do not share the same context information 232, a likelihood of race conditions may be reduced or even eliminated when the multiple testing threads 248 are executed in parallel.

The performance metrics module 228 may be configured to receive performance metrics 234 from each testing thread 248 after the parallel execution of the multiple testing threads 248. The performance metrics 234 may indicate a robustness level for the application or service 270 (or the portion of the application or service 270) that is tested in the service provider environment 200. In one example, the performance metrics module 228 may aggregate the performance metrics 234 in order to provide a report of application test metrics. The report may identify potential problems in the application or service 270. For example, the report may indicate whether the performance metrics meet defined performance criteria, and if the defined performance criteria are not met, the report may recommend updating code in the application or service 270 and then retesting the application or service 270.

The client device 260 may be utilized by a customer to request a computing instance and to control an executing computing instance. The client device 260 may include any device capable of sending and receiving data over the network 250. The client device 260 may comprise, for example a processor-based system such as a computing device. The client device 260 may be a device such as, but not limited to, a desktop computer, laptop or notebook computer, tablet computer, mainframe computer system, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
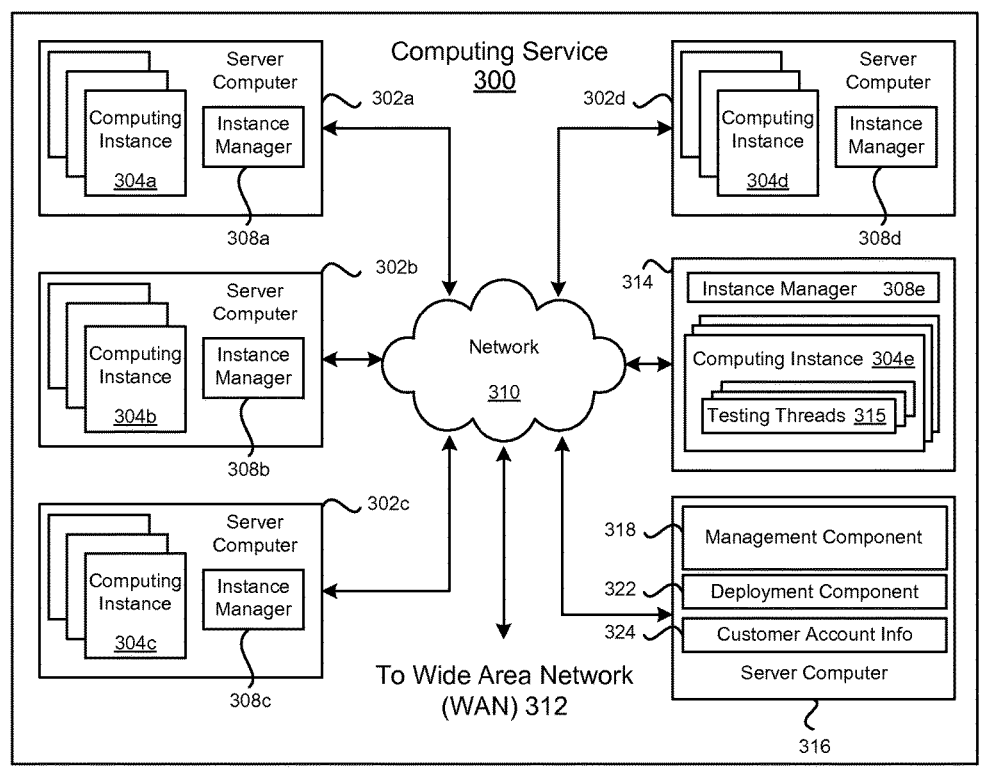
FIG. 3 is a block diagram of a computing service environment according to an example of the present technology.

FIG. 3 is a block diagram illustrating an example computing service 300 that may be used to execute and manage a number of computing instances 304a-e upon which the present technology may execute. In particular, the computing service 300 depicted illustrates one environment in which the technology described herein may be used. The computing service 300 may be one type of environment that includes various virtualized service resources that may be used, for instance, to host computing instances 304a-e.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-e. Computing instances 304a-e may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-e capable of executing the instances. The instance manager 308a-e may be a hypervisor, virtual machine monitor (VMM), or another type of program configured to enable the execution of multiple computing instances 304a-e on a single server. Additionally, each of the computing instances 304a-e may be configured to execute one or more applications.

One or more server computers 314 and 316 may be reserved to execute software components for implementing the present technology or managing the operation of the computing service 300 and the computing instances 304a-e. For example, the server computer 314 may execute testing threads 315. The testing threads 315 may be executed in parallel using testing context information from a unit testing framework. The testing context information may be linked to each testing thread 315. In one example, each testing thread 315 may be executed in order to test a portion of an application. Therefore, when performing application tests, multiple testing threads 315 may be executed using the computer instance 304e running on the server computer 314.

A server computer 316 may execute a management component 318. A customer may access the management component 318 to configure various aspects of the operation of the computing instances 304a-e purchased by a customer. For example, the customer may setup computing instances 304a-e and make changes to the configuration of the computing instances 304a-e.

A deployment component 322 may be used to assist customers in the deployment of computing instances 304a-e. The deployment component 322 may have access to account information associated with the computing instances 304a-e, such as the name of an owner of the account, credit card information, country of the owner, etc. The deployment component 322 may receive a configuration from a customer that includes data describing how computing instances 304a-e may be configured. For example, the configuration may include an operating system, provide one or more applications to be installed in computing instances 304a-e, provide scripts and/or other types of code to be executed for configuring computing instances 304a-e, provide cache logic specifying how an application cache should be prepared, and other types of information. The deployment component 322 may utilize the customer-provided configuration and cache logic to configure, prime, and launch computing instances 304a-e. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
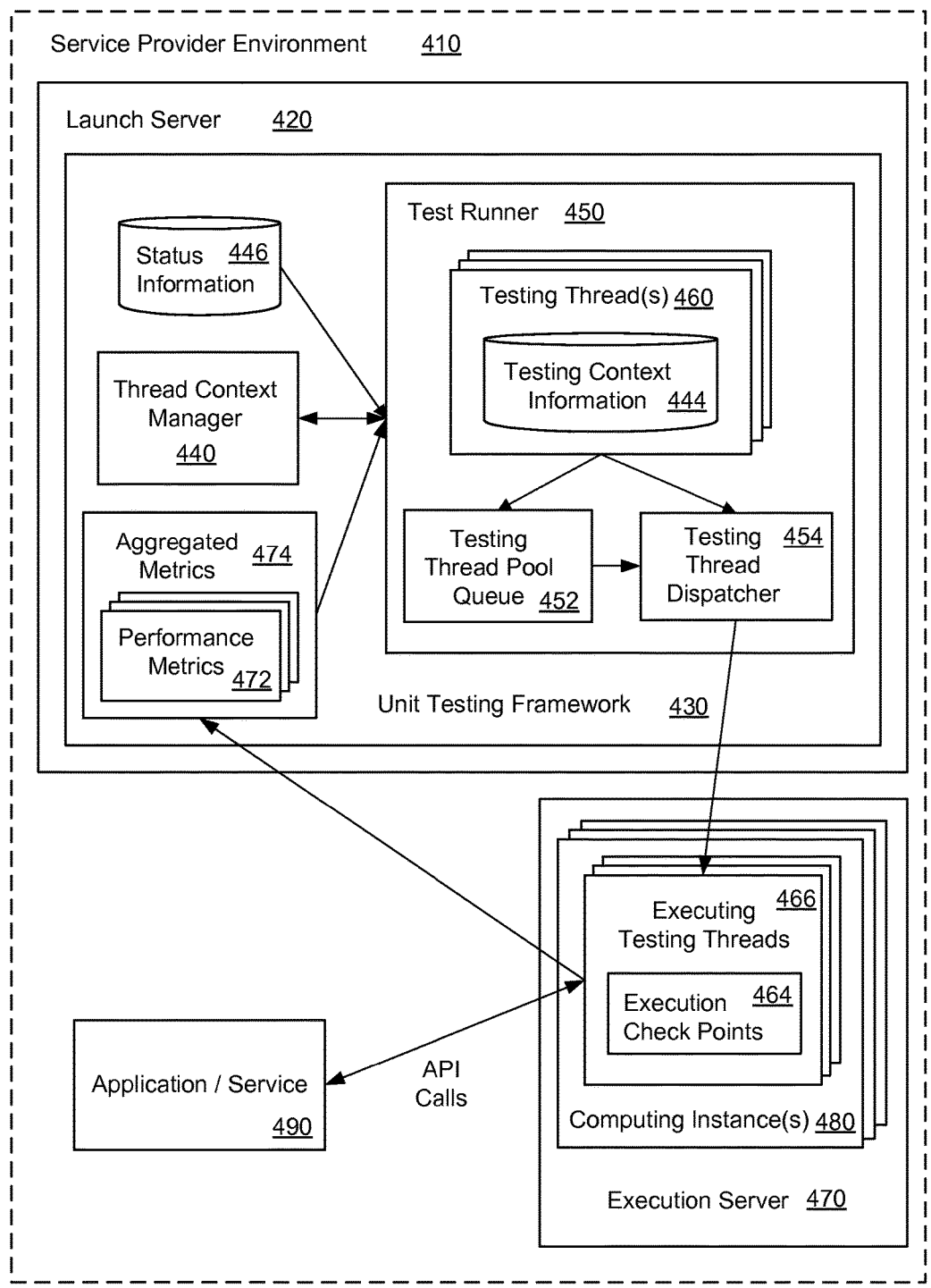
FIG. 4 illustrates a system and related operations for testing an application in a distributed service provider environment according to an example of the present technology.

FIG. 4 illustrates an exemplary system and related operations for testing an application using a unit testing framework 430 in a service provider environment 410. For example, the application may be regression tested, stress tested or load tested in order to detect performance problems or determine a robustness level of the application. In one example, various execution orders from multiple clients that are directed to the application may be intermingled. In this case, the application may be tested to verify that although multiple application program interface (API) calls may be performed without an execution guarantee, responses to the API calls are deterministic (i.e., the application produces the same output when provided with the same input) and occur within an expected amount of time. As a non-limiting example, the application that is tested may be related to monitoring customer activity in a computing service environment. For example, the application that is tested may function to collect and track metrics, collect and monitor log files, provide resource utilization, provide application performance, set alarms, etc. with respect to customer activity in the computing service environment. Accordingly, test API calls may be made by executing testing threads 466 to an application or service 490 for monitoring customer activity.

In one configuration, a test runner 450 may operate within the unit testing framework 430. The test runner 450 may operate on a launch server 420 in the service provider environment 410. The test runner 450 may facilitate the testing of the application using the unit testing framework 430. For example, the test runner 450 may include a testing thread dispatcher 454 (or a testing thread pool manager). The testing thread dispatcher 454 may manage a defined number of testing threads 460 that are to be executed at a given time in order to perform an application test. Each testing thread 460 may be associated with an application unit to be tested. The application unit may be a portion of the application or service 490 that is being tested using the testing threads 260 dispatched by the test runner 450 that operates in the unit testing framework 430. For example, the application unit may include a specific application source code class, a group of functions, etc. Therefore, a plurality of testing threads 460 may be associated with a plurality of application units to be tested. As a non-limiting example, the defined number of testing threads 460 that are maintained by the testing thread dispatcher 454 may be limited to 10,000 testing threads at a given time.

In one example, the test runner 450 may launch testing threads 460 for execution on an execution server 470. The test runner 450 may launch the testing threads 460 for execution so that the application tests on the application or service 490 may be performed. In one example, the application tests may each be an instance of a Java method. These Java methods may be submitted into the testing thread dispatcher 454, and each Java method may be a particular testing thread 460.

The test runner 450 may use the testing thread dispatcher 454 to dispatch multiple testing threads 460 for execution in parallel. In one example, the test runner 450 may use the testing thread dispatcher 454 to dispatch the multiple testing threads 460 for execution on an execution server 470 in the service provider environment 410. Multiple executing test threads 466 may be executed on the execution server 470 in parallel, for example, using computing instances 480 that are running on the execution server 470.

In one configuration, the test runner 450 may dispatch the multiple testing threads 460 with testing context information 444 for execution in parallel. The testing context information 444 may be related to each testing thread 460. More specifically, separate context information 444 may be linked to each testing thread 460 that is being executed. The context information 444 may be supplied for each testing thread 460 using a thread context manager 440 in the unit testing framework 430. Since the testing threads 460 may use to a separate copy of test data during execution (i.e., the testing context information 444 may be localized with respect to a particular testing thread 460), the multiple testing threads 460 may be executed in parallel without creating race conditions.

In one example, the testing context information 444 for each testing thread 460 may include a test name associated with the testing thread 460 to be executed, test data, a list of pre-computations to be performed before execution of the testing thread 460, and a list of tear downs to be performed before execution of the testing thread 460. In addition, the testing context information 444 may include parameters (e.g., numerical, text, records, etc.) to be used for API calls or other functional operations of the application being tested. As non-limiting examples, a pre-computation to be performed prior to execution of the testing thread 460 may include a database table initialization or a database table creation. As another non-limiting example, a tear down to be performed before execution of the testing thread 460 may include a database table deletion.

A status (or state) may be maintained for each executing testing thread 466. The executing testing threads 466 may report status information 446 to the thread context manager 440 of the unit testing framework 430. The status information 446 may be reported after the executing testing thread 466 completes an application test. The status information may indicate whether the executing testing threads 460 were successfully executed or failed during execution.

The testing thread dispatcher 454 in the test runner 450 may maintain a fixed number of testing threads 460 that are to be executed in parallel at a given time. In one example, additional testing threads 460 that are waiting to be executed may be included in a testing thread pool queue 452. The additional testing threads 460 may wait in the testing thread pool queue 452 when the number of testing threads 460 maintained at or managed by the testing thread dispatcher 454 has reached full capacity. As executing testing threads 466 finish executing, the additional testing threads 460 may be moved to the testing thread dispatcher 454 and launched for execution.

As a non-limiting example, the test runner 450 may generate 50 application tests to be performed to test the application or service 490. The testing thread dispatcher 454 may be capable of maintaining 30 testing threads. So, up to 30 executing testing threads (corresponding to 30 application tests) may be executed in parallel at the execution server 470 at a given time. The remaining 20 application tests may wait in the testing thread pool queue 452. As the executing testing threads 466 finish executing, the application tests waiting in the testing thread pool queue 452 may be moved to the testing thread dispatcher 454 and launched for execution.

In one configuration, the executing testing threads 466 may generate performance metrics 472 after being executed on the execution server 470. For example, the performance metrics 472 may indicate whether the application test succeeded or failed. The performance metrics 472 for the plurality of executing testing threads 466 may be compiled to form aggregated metrics 474. The aggregated metrics 474 may provide an overall assessment of the application or service 490 that is tested. The aggregated metrics 474 may be provided to the test runner 450 and/or the unit testing framework 430, upon which the aggregated metrics 474 may be available for user viewing and/or analysis.

In one example, the executing testing threads 466 may include execution check points 464. The execution check points 464 may be implemented to occur during an execution cycle of the executing testing threads 466. Each execution check point 464 may result in a data point or report that is provided to the test runner 450. As an example, the execution check points 464 may be used to determine amounts of time for: performing an initial service call or API call (e.g., for a log event) between the executing testing threads 466 and the application or service 490, retrieving requested information (e.g., log events), verifying the retrieved information or other operations. These amounts of time may be useful during stress testing of the applications because, for example, if a certain amount of stress is placed on an application, a performance level of the application may be determined during that stress test. In some situations, a service level agreement (SLA) may govern that the API return responses within a defined amount of time (e.g., two seconds or ten seconds). Therefore, using the execution check points may be useful to determine whether the SLA is breached during stress testing.

As a non-limiting example, a first application test may include API calls to the application or service 490 to write data, the test may then perform calls to the application or service 490 to read data, and then the test may verify that the data written and the data read are similar. A second application test may include a second set of API calls which performs similar write, read and verification functions, but does not use the same test data with respect to the first application test. In this example, the first application test may be used to write personal data and the second application test may be used to write department data. The first application test may be used to write person A's information, read person A's information, and validate if the write and read information are similar. With respect to the first application test, a response time for reading, a response time for writing, and whether a validation has succeeded may be determined at the testing thread that is being used to run the first application test. This information with respect to the first application test may be provided to the unit testing framework 430. As an example, the information related to the first application test may indicate a duration of 5 seconds to write to the API, 3 seconds to read from the API, and 2 seconds to perform the validation. In addition, information with respect to the second application test may be provided to the unit testing framework 430. This information with respect to the second application test may also include the response times for reading and writing, as well as validation. In one example, the unit testing framework 430 may receive an array of such data for a plurality of application tests. The array of data may be with respect to a read function, a write function and a validation function for the plurality of application tests. The unit testing framework 430 may extract performance metrics from the array of data. For example, the unit testing framework 430 may identify a minimum amount of time, a maximum amount of time, a mean amount of time, a median amount of time, etc. for each of the tasks performed during the application tests (e.g., writing data, reading data and validation).

Figure 5:
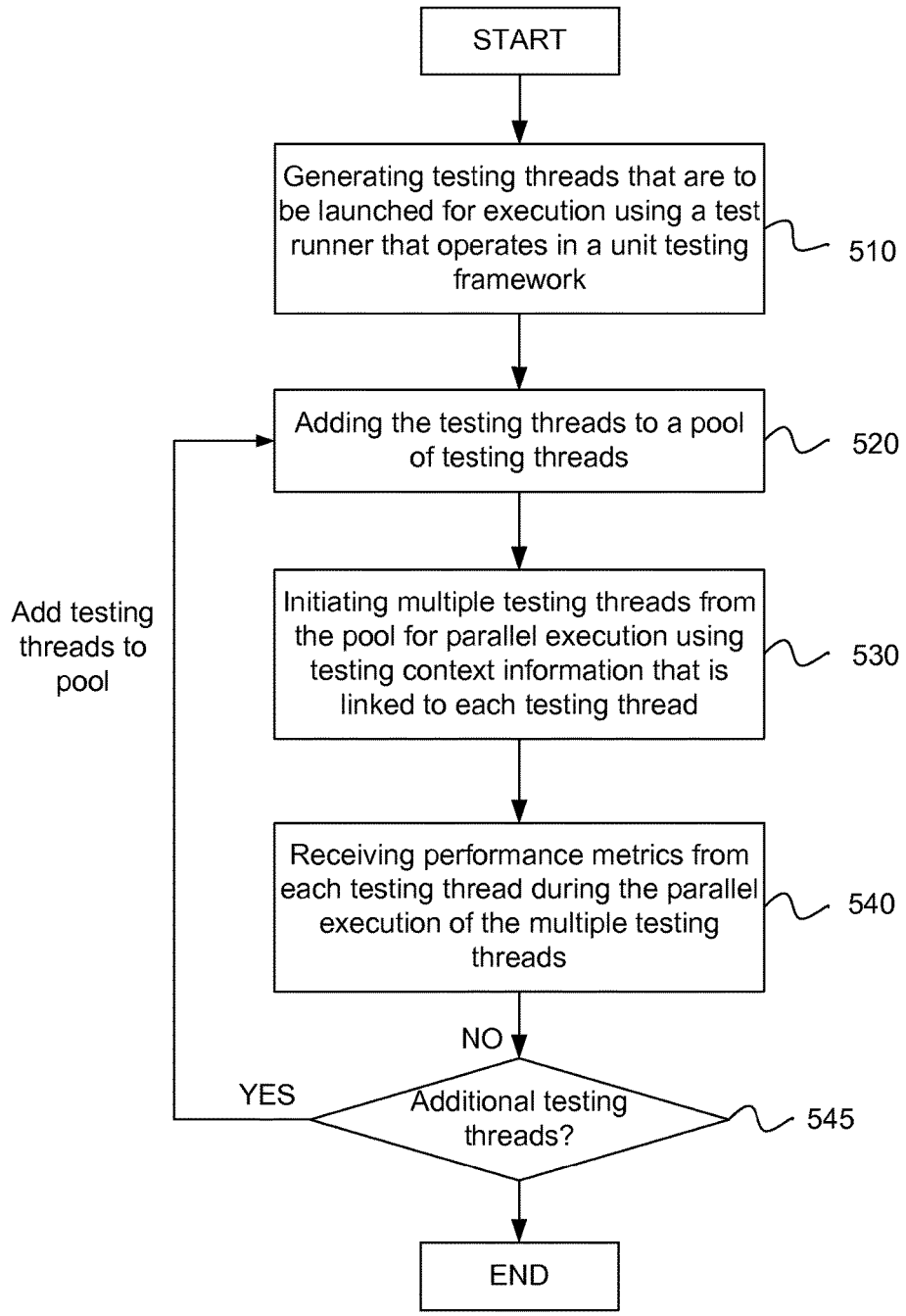
FIG. 5 is a flowchart of an example method for testing an application in a distributed service provider environment.

FIG. 5 illustrates an example of a method for testing an application in a service provider environment. Testing threads that are to be launched for execution using a test runner that operates in a unit testing framework may be generated, as in block 510. The testing threads may be launched in order to perform testing of the application. In one example, a single testing thread may be used for testing a portion of the application. The testing thread may be an executable thread that is to be executed in order to test the portion of the application.

The testing threads may be added to a pool of testing threads that are to be launched for execution using the unit testing framework, as in block 520. The fixed pool may enable a defined number of testing threads to be executed at the same time. As a non-limiting example, the fixed pool may enable 10,000 testing threads to be executed at the same time.

Multiple testing threads from the pool may be initiated for parallel execution using testing context information that is linked to each testing thread, as in block 530. The multiple testing threads may be executed in parallel for testing the application using a test runner that operates using the unit testing framework. One non-limiting example of the unit testing framework is a JUnit testing framework. The multiple testing threads may be initialized by a thread pool dispatcher in the test runner prior to being launched for parallel execution on an execution server.

The testing context information may be locally maintained at each testing thread and received from a thread context manager in the unit testing framework. The testing context information may be separate for each testing thread. The testing context information may include a test name associated with the testing thread to be executed, test data, a list of pre-computations to be performed before execution of the testing thread, and a list of tear downs to be performed before execution of the testing thread.

Performance metrics may be received from each testing thread after the parallel execution of the multiple testing threads, as in block 540. The performance metrics may be based on a load placed on portions of the application tested in the service provider environment. The performance metrics for the application that is tested may be aggregated in order to provide a report of application test metrics.

In one configuration, a determination as to whether additional testing threads are waiting to be executed may be performed, as in block 545. For example, the additional testing threads may be included in the testing thread pool queue. If additional testing threads are waiting to the executed in the testing thread pool queue, the additional threads may be added to the fixed pool of testing threads after testing threads currently in the fixed pool have finished being executed. The performance metrics for the testing threads may indicate when the testing threads currently in the fixed pool have finished being executed.

Figure 6:
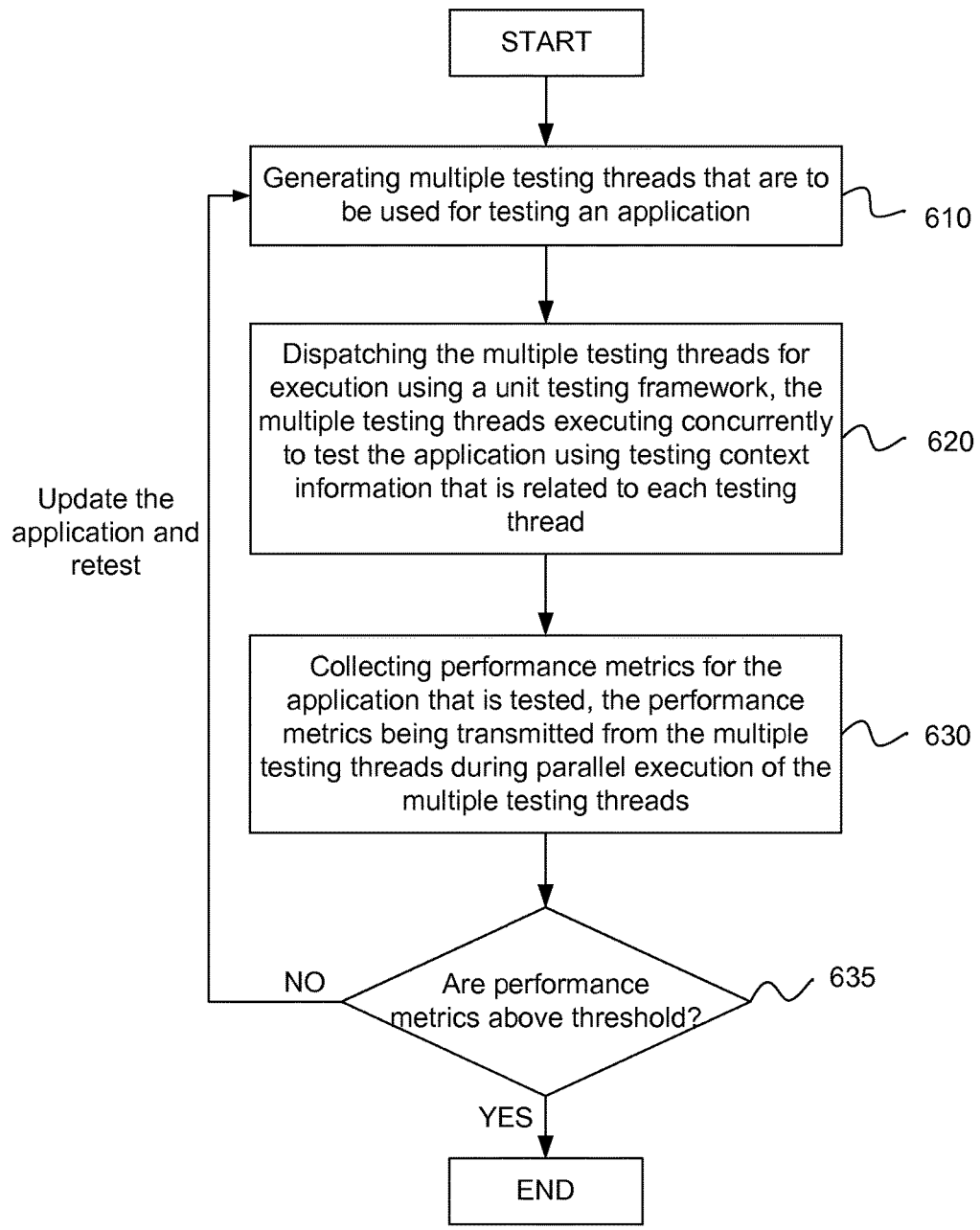
FIG. 6 is a flowchart of an example method for testing applications.

FIG. 6 illustrates an example of a method for testing applications. Multiple testing threads that are to be used for testing an application may be generated, as in block 610. In one example, a fixed pool of testing threads may be maintained. For example, the fixed pool may enable a defined number of testing threads to be executed in parallel. As testing threads in the fixed pool finish executing, additional testing threads may be added to the fixed pool.

The multiple testing threads may be dispatched for execution using a unit testing framework. The multiple testing threads may be executed concurrently to test the application using testing context information that is related to each testing thread, as in block 620. The multiple testing threads may be dispatched to be concurrently executed for testing the application using a test runner that operates using the unit testing framework. In addition, one or more check points may be incorporated during application testing to determine an execution time for executing the testing threads.

The testing context information may be locally maintained for each testing thread using a thread context manager in the unit testing framework. In one example, the testing context information for each testing thread may include a test name associated with the testing thread to be executed, test data, a list of pre-computations to be performed before execution of the testing thread, and a list of tear downs to be performed before execution of the testing thread. In addition, the testing context information may include parameters (e.g., numerical, text, records, etc.) to be used for API calls or other functional operations of the application being tested. Separate testing context information may be linked to each testing thread in order to reduce a likelihood of race conditions occurring during testing of the application.

Performance metrics may be collected for the application that is tested, as in block 630. The performance metrics may be transmitted from the multiple testing threads during parallel execution of the multiple testing threads. In one example, the performance metrics may be reported for the application that is tested in order to identify problems in the application. In addition, status information for each testing thread that has been dispatched may be stored by the unit testing framework.

In one configuration, a determination may be made as to whether the performance metrics meet a defined threshold or defined performance criteria, as in block 635. If the performance metrics meet the defined threshold or defined criteria, then testing of the application may be finished. If the performance metrics do not meet the defined threshold or defined criteria, then portions of the application may be updated and then the application may be retested. Further, specific bugs, error, crashes or problems may be identified.

In one example, a single testing thread in the fixed pool may be dispatched for execution using the unit testing framework in order to test a portion of the application. In another example, the testing threads corresponding to portions of an application waiting to be tested may be initially included in a testing thread pool queue. The testing threads may be subsequently moved from the testing thread pool queue to the fixed pool of testing threads that are to be launched for execution using the unit testing framework.

Figure 7:
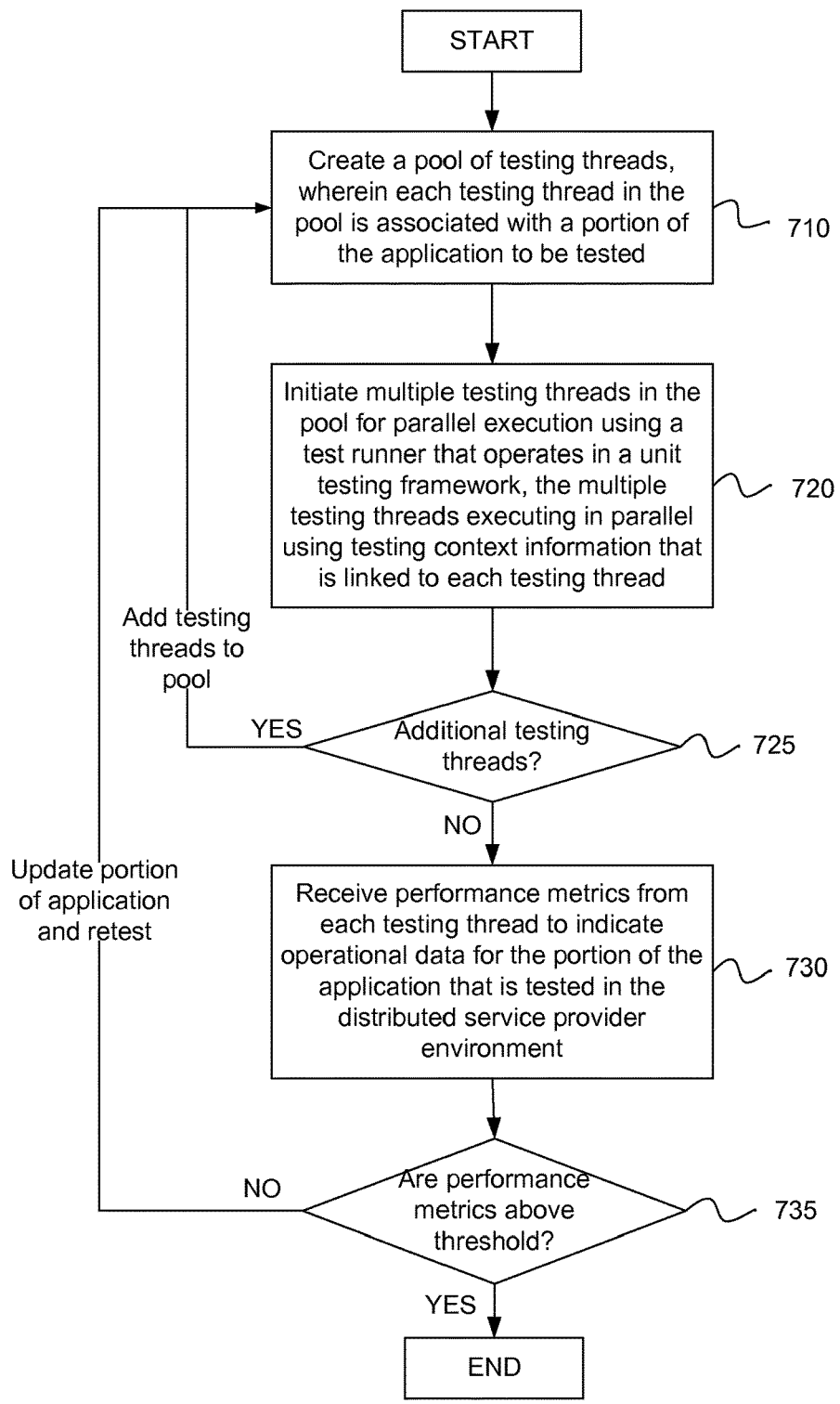
FIG. 7 illustrates functionality of a system for testing an application in a distributed service provider environment according to an example of the present technology.

FIG. 7 illustrates functionality of a system for testing an application in a service provider environment. A pool of testing threads may be created, as in block 710. Each testing thread in the pool may be associated with a portion of the application to be tested. The pool of testing threads may be a fixed pool that initiates a defined number of testing threads at a time for execution. Testing threads that are waiting to be executed may be included in a testing thread pool queue before being added to the pool of testing threads.

Multiple testing threads in the pool may be initiated for parallel execution using a test runner that operates in a unit testing framework, as in block 720. The multiple testing threads may be executed in parallel using separate testing context information that is linked to each testing thread or contained by the testing thread. The multiple testing threads may be executed in parallel for testing the application using a test runner that operates using the unit testing framework. In addition, status information for each testing thread that has been initiated for execution may be stored by the unit testing framework In one configuration, a determination as to whether additional testing threads are waiting to be executed may be performed, as in block 725. If additional testing threads are waiting to the executed, the additional threads may be added to the pool of testing threads after testing threads currently being executed have finished.

Performance metrics may be received from each testing thread to indicate operational data for the portion of the application that is tested in the service provider environment, as in block 730. In one example, the performance metrics for the application that is tested may be aggregated in order to provide a report of application test metrics.

In one configuration, a determination may be made as to whether the performance metrics meet a defined threshold, as in block 735. If the performance metrics meet the defined threshold, then testing of the application may be finished. If the performance metrics do not meet the defined threshold, then portions of the application may be updated and the application may be retested.

Figure 8:
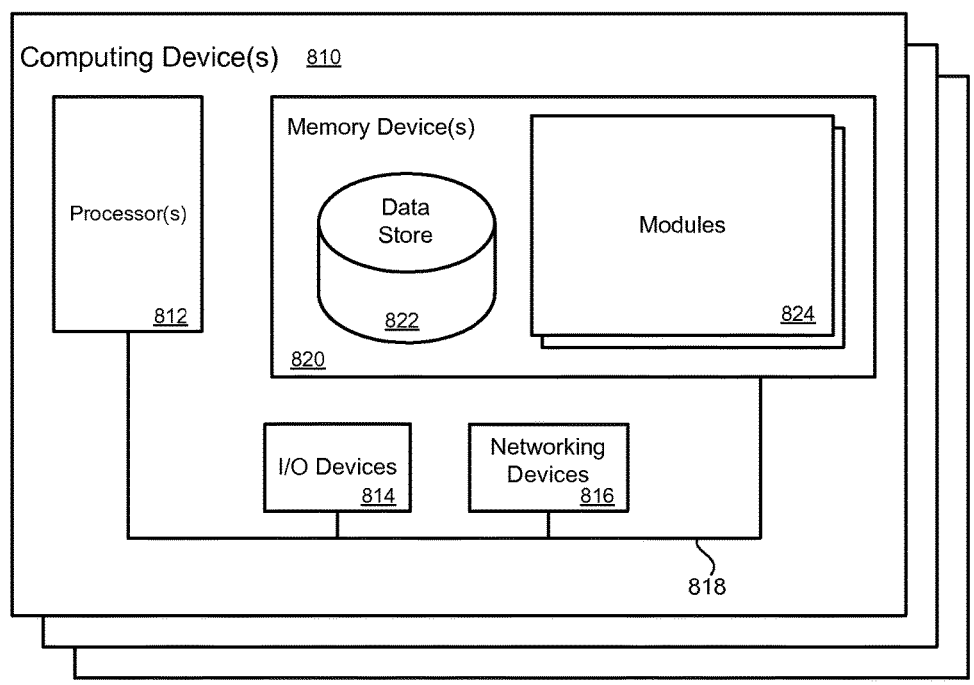
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method, comprising:
   identifying testing threads that are to perform testing of an application; and
   launching the testing threads for parallel execution based, at least in part, on testing context information associated with each testing thread, wherein the testing context information includes a list of pre-computations to be performed before execution of the testing thread, and a list of tear downs to be performed before execution of the testing thread.

2. The method of claim 1, further comprising:
   receiving performance metrics for each testing thread after the parallel execution of the testing threads, the performance metrics based at least in part on a load placed on portions of the application tested in the service provider environment; and
   aggregating the performance metrics for the application that is tested in order to provide a report of application test metrics.

3. The method of claim 1, wherein the testing context information is independent for each testing thread that is being launched from a test runner that operates in a unit testing framework of the service provider environment.

4. The method of claim 1, wherein the testing context information includes a test name associated with the testing thread to be executed.

5. The method of claim 1, wherein the testing threads are initialized using the testing context information by a thread pool dispatcher in a test runner prior to being launched for parallel execution on an execution server.

6. A method for testing applications, the method comprising:
- identifying a plurality of testing threads that are to be used for testing an application;
- dispatching the plurality of testing threads for execution, the plurality of testing threads executing concurrently to test the application using testing context information that is linked to each testing thread, wherein the testing context information is locally maintained at each of the plurality of testing threads, and the testing context information for each testing thread includes a list of pre-computations to be performed before execution of the testing thread, and a list of tear downs to be performed before execution of the testing thread; and
- collecting performance metrics for the application that is tested, the performance metrics being transmitted from the plurality of testing threads during execution of the plurality of testing threads.

7. The method of claim 6, further comprising reporting the performance metrics for the application that is tested to identify problems in the application.

8. The method of claim 6, wherein the plurality of testing threads are executed concurrently for testing the application using a test runner that operates using a unit testing framework.

9. The method of claim 6, wherein the testing context information is locally maintained for each testing thread using a thread context manager in a unit testing framework.

10. The method of claim 6, wherein the testing context information for each testing thread includes a test name associated with the testing thread to be executed and test data.

11. The method of claim 6, wherein separate testing context information is linked to each testing thread in order to reduce a likelihood of race conditions occurring during testing of the application.

12. The method of claim 6, further comprising maintaining a pool of testing threads, wherein a single testing thread in the pool is dispatched for execution using a unit testing framework in order to test a portion of the application.

13. The method of claim 6, wherein status information for each testing thread that has been dispatched for execution is stored by a unit testing framework.

14. The method of claim 6, wherein testing threads corresponding to portions of an application waiting to be tested are initially included in a testing thread pool queue, the testing threads being subsequently moved from the testing thread pool queue to a pool of testing threads that are to be launched for execution using a unit testing framework.

15. The method of claim 6, further comprising incorporating one or more check points during application testing to determine an execution time for executing portions of the plurality of testing threads.

16. A system for testing an application in a service provider environment, the system comprising:
- a processor;
- a memory device including a data store to store a plurality of data and instructions that, when executed by the processor, cause the processor to:
- create a pool of testing threads, wherein each testing thread in the pool is associated with a portion of the application to be tested;
- initiate multiple testing threads in the pool for parallel execution using a test runner that operates in a unit testing framework, the multiple testing threads executing in parallel using testing context information that is linked to each testing thread, wherein the testing context information includes a list of pre-computations to be performed before execution of the testing thread, and a list of tear downs to be performed before execution of the testing thread; and
- receive performance metrics from each testing thread to indicate operational data for the portion of the application that is tested in the service provider environment.

17. The system of claim 16, wherein the plurality of data and instructions, when executed by the processor, cause the processor to: aggregate the performance metrics for the application that is tested in order to provide a report of application test metrics.

18. The system of claim 16, wherein the pool of testing threads is a fixed pool that initiates a defined number of testing threads for execution at a time, wherein testing threads that are waiting to be executed are included in a testing thread pool queue before being added to the pool of testing threads.

19. The system of claim 16, wherein the multiple testing threads are executed in parallel for testing the application using a test runner that operates using the unit testing framework.

20. The system of claim 16, wherein status information for each testing thread that has been initiated is stored by the unit testing framework.

* * * * *